United States Patent [19]
Edel et al.

[11] Patent Number: 4,891,771
[45] Date of Patent: Jan. 2, 1990

[54] COLUMN BALANCING CONTROL

[75] Inventors: Thomas R. Edel, Austin; Robert A. Pascoe, Grapevine, both of Tex.

[73] Assignee: International Business Machines Corporation, Armonk, N.Y.

[21] Appl. No.: 136,163

[22] Filed: Dec. 18, 1987

[51] Int. Cl.[4] .................. G06F 3/12; G06F 15/626; B41J 11/44; B41B 17/00

[52] U.S. Cl. ............................ 364/523; 364/900; 400/76; 400/279; 354/7

[58] Field of Search ... 364/200 MS File, 900 MS File, 364/300, 518, 523, 521; 400/3–5, 63, 76, 279; 354/7–9

[56] References Cited

U.S. PATENT DOCUMENTS 4,575,813 3/1986 Bartlett et al. .
4,608,664 8/1986 Bartlett et al. .
4,710,886 12/1987 Heath .................. 364/519
4,723,210 2/1988 Barker et al. .......... 364/300
4,723,211 2/1988 Barker et al. .......... 364/300

Primary Examiner—David L. Clark
Attorney, Agent, or Firm—Douglas H. Lefeve

[57] ABSTRACT

A text editor provides the capability of balancing data for different sets of identified columns within the same page and across multiple imaged pages. Column balancing, as used herein is the technique of dividing an entity to be displayed into a number of columns of substantially similar size. This allows facing pages in a book to be balanced, selected text data on a page to be either balanced or not balanced, and text data associated with logical document constructs (e.g., chapters) to be independently balanced.

18 Claims, 5 Drawing Sheets

INDEX TABLE FOR COLUMN BALANCING

STATE A

| BCC ID = 1 | LOCATION IN DOCUMENT - BYTE 500 | |
|---|---|---|

STATE B

| BCC ID = 1 | LOCATION IN DOCUMENT - BYTE 500 | POINTER TO NESTED BCC ID = 2 |
|---|---|---|
| BCC ID = 2 | LOCATION IN DOCUMENT - BYTE 850 | |

STATE C

| BCC ID = 1 | LOCATION IN DOCUMENT - BYTE 500 | NESTED AREA BYPASS 850-900 POINTER TO NESTING (BCC ID =1) |
|---|---|---|

```
BEGIN          BEGIN           END             END
BCC            BCC             BCC             BCC
ID = 1         ID = 2          ID = 2          ID = 1
  •              •               •               •
  A              B               C               D

500   BYTES →  850             900             1240
```

COLUMN BALANCING CONTROL

TECHNICAL FIELD

This invention relates to document composition systems, particularly text editors which can offer the capability of balancing data for different sets of identified columns within the same page and across multiple imaged pages. This allows facing pages in a book to be balanced, selected text data on a page to be either balanced or not balanced, and text data associated with logical document constructs (e.g., chapters) to be independently balanced.

BACKGROUND ART

Column balancing may be defined as the technique of dividing an entity to be displayed into a number of columns of substantially similar size. The most common example of column balancing may be found in newspapers, magazines and books, wherein pages are often presented in columns of text in which the number of text lines within columns are of approximately equal length.

This invention is related to the controlling of the column balancing function as opposed to an algorithm for the act of column balancing itself. For examples of algorithms related to the act of column balancing itself, reference is made to U.S. Pat. Nos. 4,575,813, issued Mar. 11, 1986 and 4,608,664, issued Aug. 26, 1986, both filed Feb. 23, 1983 by G. M. Bartlett et al, both entitled "Automatically Balancing and Vertically Justifying a Plurality of Text/Graphics Columns", and both assigned to the assignee of this invention.

Current editing and formatting systems limit column balancing of text data to single pages and to all text data on a given page. This occurs, in part, because the page layout function of current document composition systems does not possess the notion of a layout capability that is separate from the data. Existing formatting products require that the columns which are to contain the balanced data be physically adjacent and that "controls" within the text data indicate a single or multiple column format mode. There is no notion of "formatting models" which can be separately specified from the data itself with an indication of which columns are or are not identified as members of a particular "column balance set".

By way of example, one practical application of column balance sets is keep unbalanced footnote data under the balanced columns in which the footnote reference occurred.

The greater the amount of data that participates in a column balance function, the more pleasing the visual effect of a "balanced column set". In current editing products, when the data to be balanced is unequal on successive pages, the reader's perception is that some pages are "well balanced" while others are not. This effect is especially noticeable for "facing" pages of an open book. It would, therefore, be highly advantageous to achieve column balancing across page boundaries and column balancing of a portion of, rather than all of, the text on a single page.

SUMMARY OF THE INVENTION

Accordingly, the concept of a user specified "data balance range" is introduced by this invention which is not hindered by document constructs such as AT90-07-010 page ends imposed by current formatting architectures. Some examples of a "data balance range" are:

1. Balancing selected columns within a partial page,
2. Balancing selected columns on a completed page, and
3. Balancing selected columns within the bounds of logical constructs that span multiple pages. Sometimes it is necessary to balance data for a single column balance set definition while the data within other potential column balance set definitions on the same page remains unbalanced due to data content. For example, whenever an image figure that floats with its text description is encountered in the text stream, it is necessary to disable column balancing because the idea is to position the image next to its description. However, other columns on the same page function independently because the disable column balance control occurred within a specific column balance set.

This invention also allows for identification of a column within a balance set where the interrupted columnar text data for the page is to be subsequently resumed. The "continuation column" identified can thus cause the formatting process to resume processing at any column set member. This format specification is defined external to the data and thus reduces the enabling and disabling controls embedded with text data.

The concept of "context directed column balancing" is not present in current formatting systems since all column definitions on a given page participate in the balance function whenever that function is activated. Context directed column balancing reduces the number of enabling and disabling controls within the text data since only the column set members participate whenever the balance function is activated from within the text data. Logical document constructs occurring within the text data can indicate that the prior text data on a multi-column page is to be balanced because of a heading construct that spans the width of the page halfway down the page.

The foregoing and other objects, features, extensions, and advantages of the invention will be apparent from the following more particular description of preferred embodiments of the invention as illustrated in the accompanying drawings.

BEST MODE FOR CARRYING OUT THE INVENTION

Figure 1:
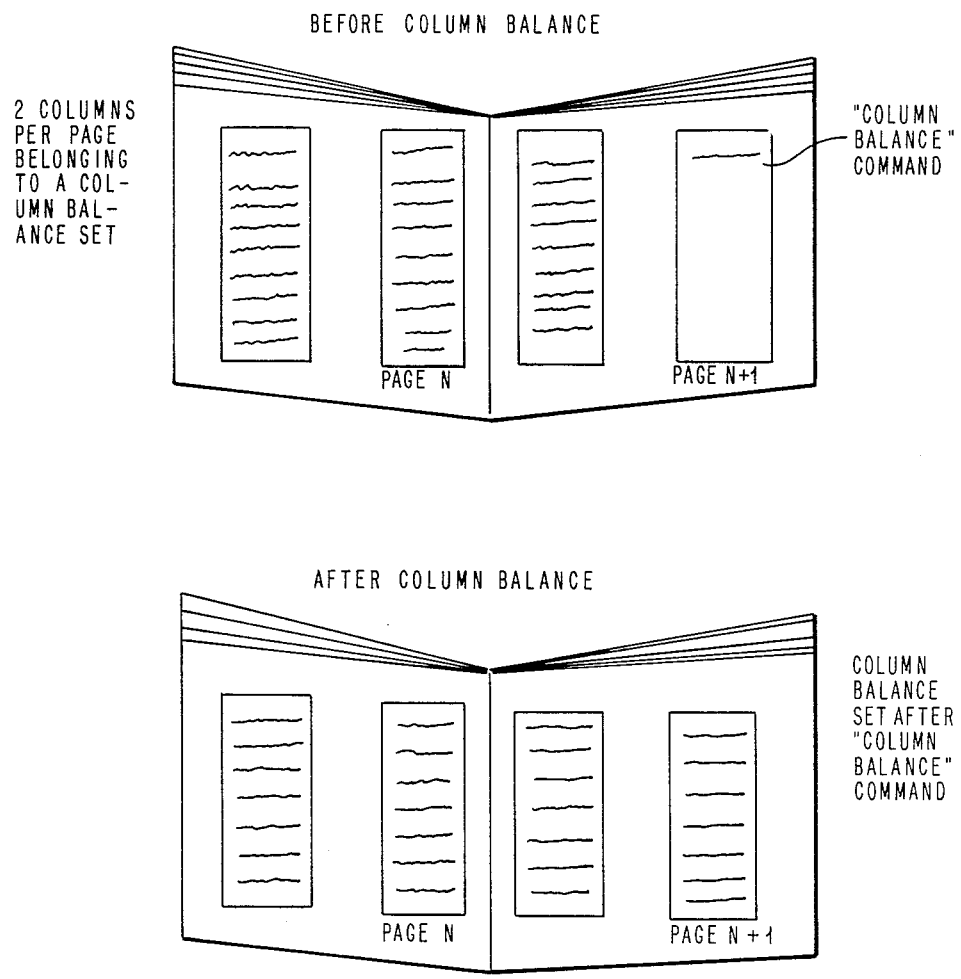
FIGS. 1–3 are pictorial examples of text prior to and after various types of column balancing that may be accomplished with this invention.

Referring now to FIG. 1, a pictorial example of text prior to and after column balancing is shown. In the upper portion of this figure is depicted a pair of opposing pages "n" and "n+1". It is desired that the content of these two pages be placed on two columns on each page. In this upper portion of FIG. 1, before column balancing has taken place, three of these columns are depicted as having nine lines of text thereon while the right-hand column Of page "n+1" is shown as having one line of text thereon. If it is desired to balance this entire portion of text on these two pages, the twenty-eight lines of text should be divided into four sets of seven lines each. This has been accomplished as shown in the lower portion of FIG. 1 wherein each of these two pages has an equal number of columns, each column of which has an equal number of lines of text.

Figure 2:
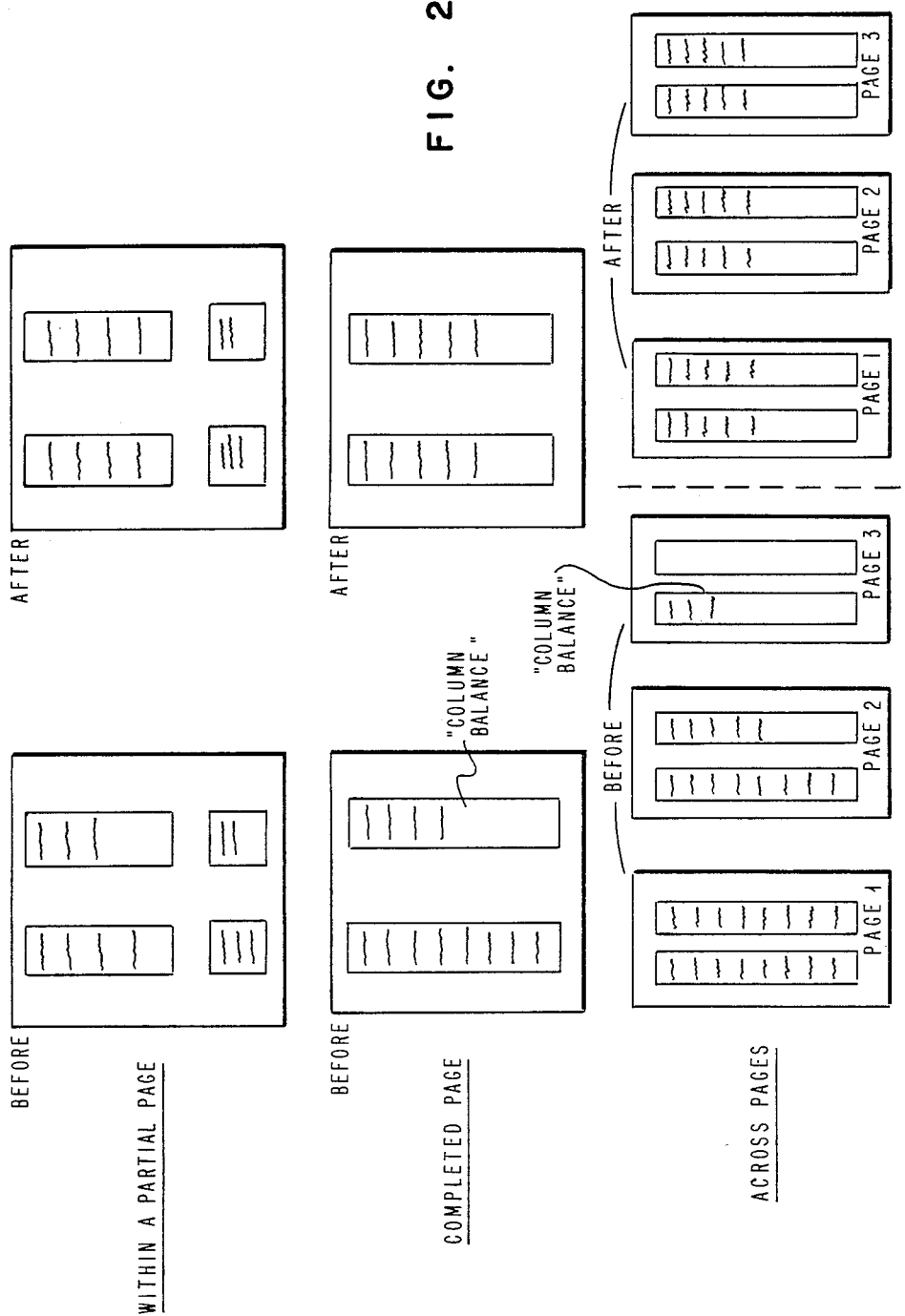

Proceeding to FIG. 2, three additional examples of column balancing are shown. In the "before" portion of Section "A" (upper left portion) of FIG. 2 is shown a page having two columns of text of unequal length. The upper right portion of FIG. 2 shows the text columns to be balanced into equal numbers of lines upon encountering a "header" logical element that possesses column balance attributes. Resumption of flowed text continues into the indicated member column. This is an example of column balancing within a partial page.

The middle set of examples in FIG. 2 shows column balancing in an environment in which the lengths of the desired columns exceed the limits of expansion of the text for column balancing purposes. Although the unequal text lengths shown in the left-hand figure in the middle set of examples is redivided into a pair of text portions having equal numbers of lines, as shown in the right-hand portion in the middle of this figure, it will be noted that the balanced text does not fill the lower portions of the designated columns on this page.

Referring now to the lower portion of FIG. 2, it will be noted that before column balanced occurs, a plurality of text columns of unequal length are found on three pages. This text is then balanced on the columns of these three pages. Because the lengths of the target areas for the columns significantly exceeds the amount of text available to be positioned within these areas, the text after balancing is unable to fill the target areas, although the portions of text in each column are of equal length.

Figure 3:
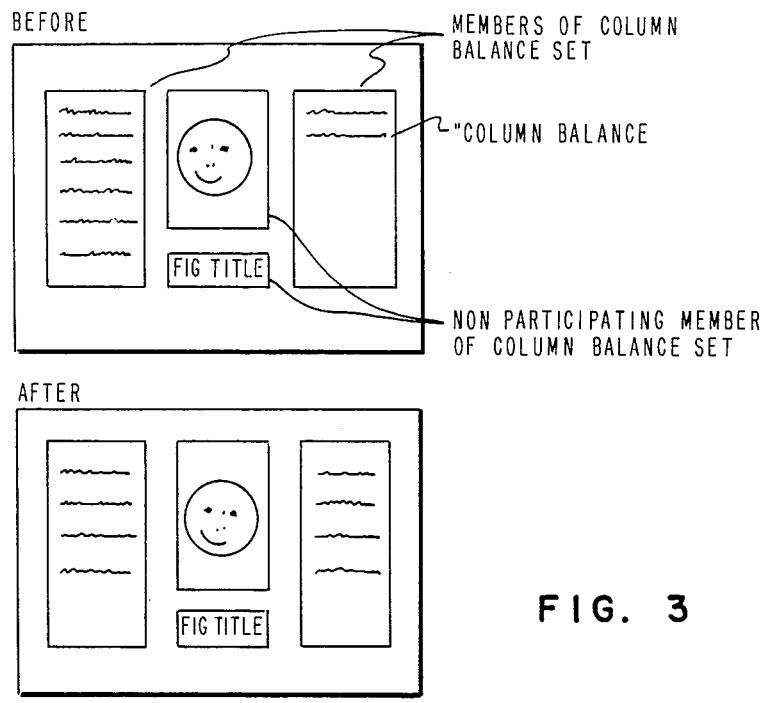

Proceeding to FIG. 3, an example of non-adjacent column balancing is shown. The text on either side of the pictorial figure and figure title is to be balanced without the pictorial figure and figure title participating in the column balancing. The text balanced around the pictorial figure and figure title is shown in the lower portion of FIG. 3. The area which does not participate in column balancing may, of course, contain more than one column. Accordingly, a variation of this concept which is handled by this invention is that of including an "inner" column balance set nested within an "outer" column balance set. In such a case, the pictorial figure and figure title in FIG. 3 might, instead, comprise two or more columns of text to be separately balanced in an area between the outer columns which, themselves, are separately balanced.

Figure 5:
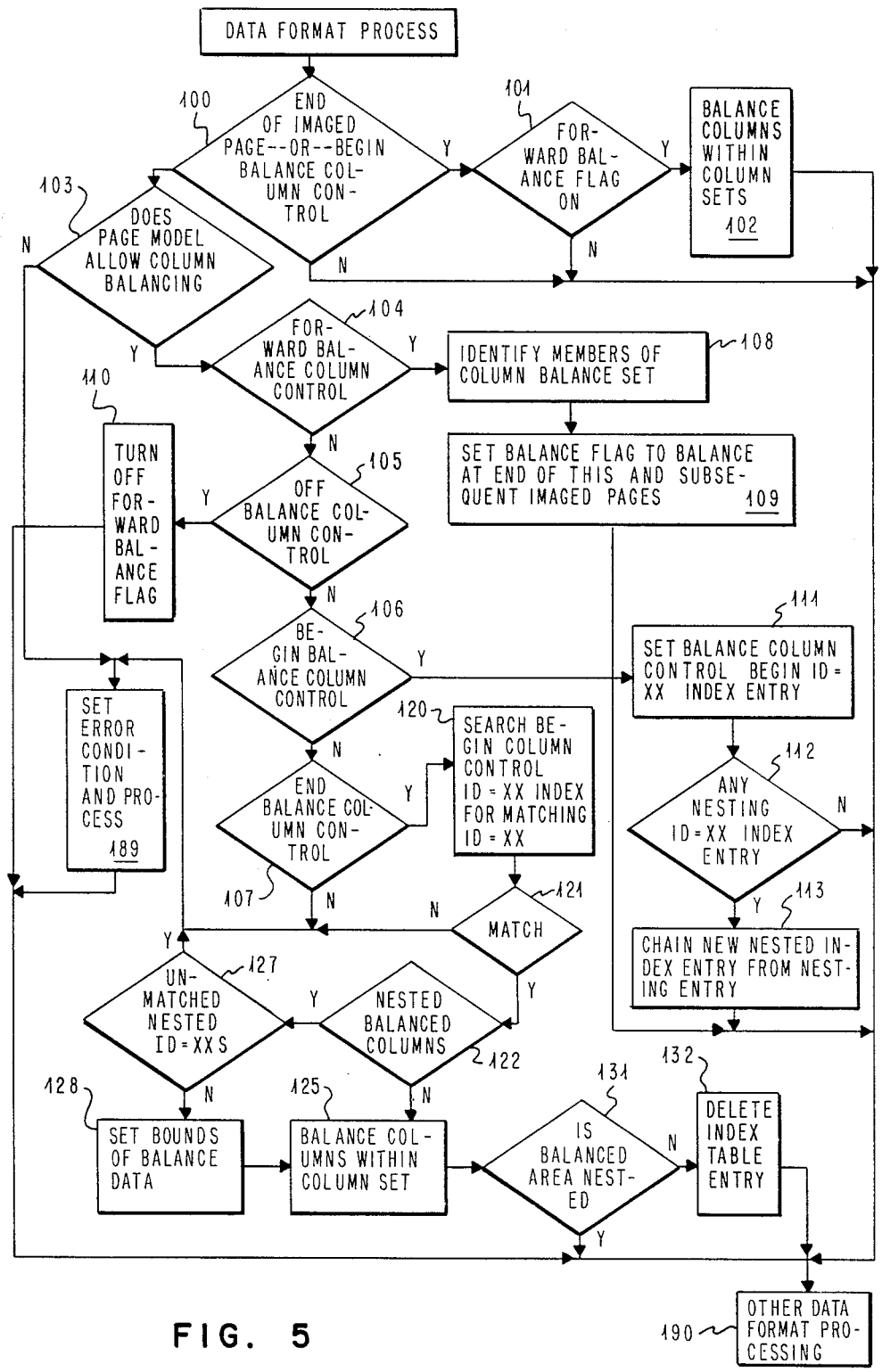
FIG. 5 is a programming flow chart which describes the logical operations performed in the implementation of this invention.

The data formatting process for column balancing begins at block 100 in FIG. 5, wherein a test is made to determine if the end of an imaged page has been reached or a balance column control code has been encountered in association with the currently addressed point in the data stream. If neither the end of the imaged page has been reached or the balance column control code has been encountered, the operation proceeds to the end, block 190, at which point other data format processing, unrelated to this invention, may take place. For example, such other data format processing may include horizontal justification, spelling verification, or other such operations unrelated to this invention.

At block 100, assume now that the end of an imaged page has been detected. Such detection may be, for example, by encountering a page end control code in the data stream. Thereafter, at 101 a test is made to determine if a forward balance flag has previously been set to an "on" state, as will be described below. If not, the operation proceeds to block 190, as described above, for other data format processing to take place relative to this imaged page. If the forward balance flag was found to be set in the on state at 101, the operation proceeds to 102 at which time column balancing is effected within the designated column sets. The algorithms for accomplishing the column balancing operations may be, for example, those taught by the aforementioned U.S. Pat. Nos. 4,575,813 and 4,608,664 to G. M. Bartlett et al.

Figure 4:
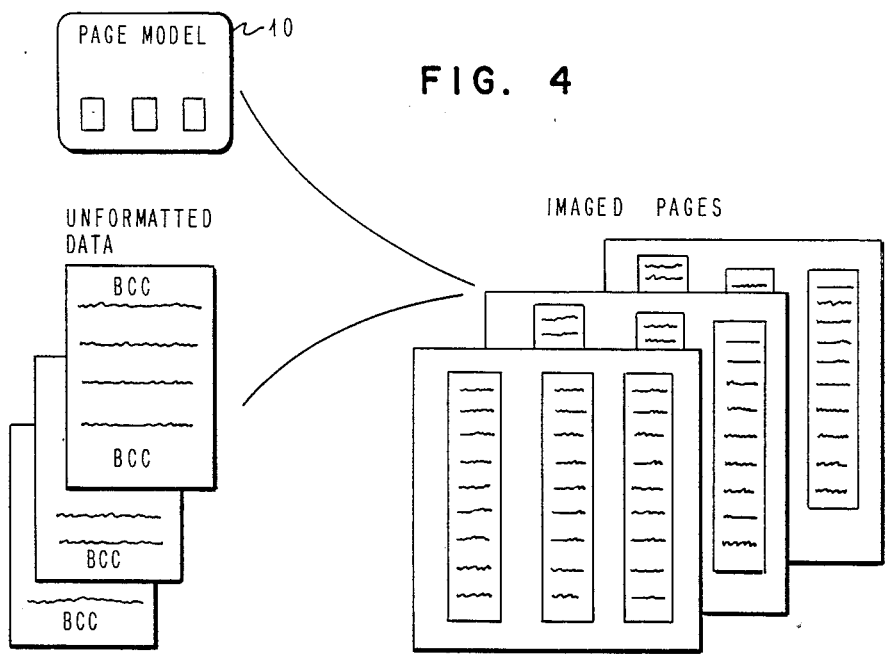
FIG. 4 is a pictorial diagram of the formatting process of this invention.

At block 100, if a balance column control code is encountered prior to reaching the end of the imaged page, the operation proceeds to 103 wherein a test is performed to determine if the page model allows column balancing. The page model is shown as element 10 in FIG. 4 and includes information relative to each page as to whether or not balancing is permitted for identified columns on each page. Assuming, at 103, that column balancing is not permitted, the operation jumps to 189 and an error condition is indicated for the process, since a balance column control was encountered for a page on which column balancing is not permitted according to the page model. Thereafter, the operation proceeds to 190 for other data format processing to take place.

At 103, assuming that column balancing is permitted and that a balance column control code has been detected, the Operation proceeds to blocks 104–107 where a series of tests are performed to determine which of four types of balance column control codes has been encountered. If a forward balance column control code is detected at 104, at 108 the member of the column balance set associated with this balance column control code is identified. Thereafter, at 109 a balance flag is set to indicate that column balancing is to take place at the end of this and subsequent imaged pages. This is the flag that causes the balancing operation at 102 to take place when the end of the imaged page is detected at block 100 and the forward balance flag is detected to be on at block 101, as described above. After the flag is set at 109, the operation jumps to 190, at which point other data format processing operations can take place.

Assume now that a forward balance column control code was not found at block 104 but that an "off" balance column control code is detected at block 105. The operation then proceeds to 110 at which time the balance flag, previously set at 109, is turned off. The operation then proceeds to block 190 wherein other data format processing operations can take place. Thereafter, if the end of an imaged page is detected at 100, the balance flag will be detected to be off at block 101 and no column balancing will thereafter take place.

Assume now that a begin balance column control code is detected at block 106. The operation then proceeds to 111 at which point an entry is made in the Index Table for Column Balancing, State "A", which is shown in more detail in FIG. 6. In the index table for column balancing an entry is made at block 111 to save the balance column control begin identifier specified in the Begin Column Balance Control command. This is needed to identify the beginning location of a balance range so that when the corresponding end balance column control is received in the text data stream, the delimiter of the data to be balanced is known.

Figures 6, 7:
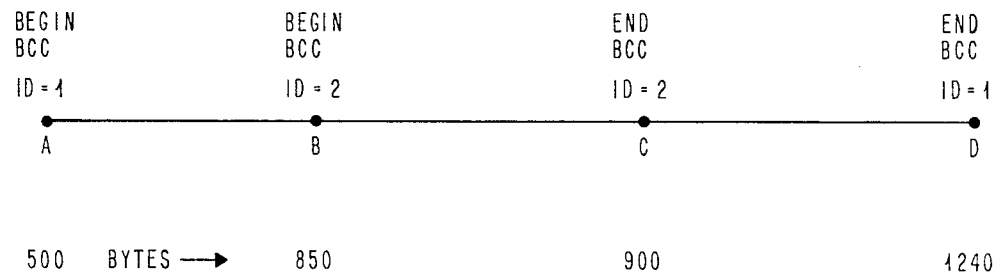
FIG. 6 shows the Index Table for Column Balancing that a process may employ when a Begin Balance Column Control code is encountered.
FIG. 7 is a pictorial diagram which shows a column balance set nested within another column balance set.

Next, a test is made at block 112 to determine if the present begin balance column control code is nested within an area of text which is already intended to be balanced as evidenced by an earlier begin balance column control code. A pictorial example of such nesting is shown in FIG. 7. If such is the case an index entry associated with that prior begin balance column control code will be found in the index table shown in FIG. 6, State "B". If the current begin balance column control code detected at block 106 is not nested, the operation proceeds to block 190 for other data format processing. If the begin balance column control code detected at 106 is nested, then the operation proceeds from block 112 to 113 at which point the new nested index entry in the index table of FIG. 6 is chained from the previous (nesting) entry. This is needed because the latest nested begin column balance control will have its corresponding end balance column control appear before the end for the nesting (outer) end balance column control. This inner, nested column balance set is not balanced when the outer, nesting column balance set ends, because the inner, nested column balance set is already balanced. After this, the operation proceeds to block 190 for other data format processing.

Assume now that the balance column control code detected in the succession of the tests in blocks 104–107 is an end balance column control code which is detected at block 107. In this case, at block 120, the index table in FIG. 6 is searched for a begin balance column control code identifier which matches the identifier with the end balance column control code detected at 107. If no match occurs at block 121, the operation proceeds to block 189 at which point an error condition is set and the process proceeds to 190 for other data format processing.

Assuming that the end balance column control code identifier can be matched with a begin balance column control code identifier, a test is made at 122 to determine if this pair of balance column control codes contains nested balance controls within an area of text having a begin and end balance column control code designated therefor. If this current pair of balance column control codes does not contain balanced columns nested within, the operation proceeds to 125 wherein the columns bounded by this pair of begin and end balance column control codes is balanced in accordance with the technique described above with reference to block 102 of this figure. If, at block 122 the current pair of begin and end balance column control codes contains nested balance controls, the operation proceeds to 127. If nested balance limits have already been balanced then this inner column balance area does not participate in outer column balancing. The operation, therefore, proceeds to 128 wherein the boundaries of the balance data are determined from the index table in FIG. 6. Thereafter, the operation proceeds to 125 wherein the columns within the column balance set are balanced. In the operation denoted at 125, a test is made at 131 to determine whether the columns currently being balanced are, themselves, a nested column balance set. If not, at 132 the entry in the index table, FIG. 6 is deleted.

If, at 127 it is found that a nested begin balance column control is present within a column balance set, and it has no nested, matching end balance column control, then an invalid set of controls is indicated which cannot be processed according to this technique. Accordingly, the operation proceeds to 189 wherein an error condition is processed.

The following programming design language listing is another form of the description of the above column balancing control process. This listing parallels the operation described above for FIG. 5.

```
IF END of Imaged Page THEN:
  IF FORWARD BALANCE Flag "on" THEN:
    Consult Page Model to determine columns to be balanced
    Balance Data in respective column balance sets
    Make any page balance format adjustments
    Footnote placement under "referencing" column
    "Pinned" data to "balanced" column data
    Return to DATA FORMAT PROCESSING
  ELSE:
    IF Balance Control found in Data to be formatted THEN:
      IF Page Model Permits Column Balancing THEN:
        IF FORWARD Balance control THEN:
          Identify Members of Column Balance Set
          Set BALANCE flag to balance data at end
          of this and subsequent pages
          Return to DATA FORMAT PROCESSING
        ELSE:
          IF COLUMN BALANCE Control Flag OFF THEN:
            Turn Off FORWARD Balance Flag
            Return to DATA FORMAT PROCESSING
          ELSE:
            IF BEGIN BALANCE Flag ON THEN:
              Set Index Entry into table identifying its
              location in the data along along with its
              corresponding Column Balance ID
              IF any outer nesting Column Balance
              Entry exists THEN:
                Chain in Index Entry for nested Column
                Balance in order to identify data
                that is already balanced WITHIN when
                the corresponding Column Balance END
                Control is interpreted for the outer
                nesting Column Balance
                Return to DATA FORMAT PROCESSING
              ELSE:
                Return to DATA FORMAT PROCESSING
              ENDIF:
            ELSE: (END COLUMN BALANCE)
              IF NOT END Column Balance THEN:
                Set Error Flag ON
                Return to DATA FORMAT PROCESSING
              ELSE:
                Search Column Balance Index for matching ID
                IF no matching ID, THEN:
                  Set Error Flag On
                  Return to DATA FORMAT PROCESSING
                ELSE:
                  IF Nested Balanced Columns THEN:
                    IF Unmatched Nested ID's THEN:
                      Set Error Flag On
                      Return to DATA FORMAT PROCESSING
                    ELSE:
                      Identify bounds of nested data
                      already balanced
                      Balance Columns within Column Set
                      IF Balanced Columns Nested THEN:
                        Return to DATA FORMAT
                        PROCESSING
                      ELSE:
                        Delete Index Table Entry
                        Return to DATA FORMAT
                        PROCESSING
                      ENDIF:
                    Return to DATA FORMAT PROCESSING
                    ENDIF:
                  ELSE:
                    Balance Columns within Column Set
                    Return to DATA FORMAT PROCESSING
                  ENDIF:
                ENDIF:
              ENDIF:
            ENDIF:
```

-continued

```
ENDIF:
ENDIF:
ELSE:
Set Error Condition that states that there are no
eligible column balance areas
Return to DATA FORMAT PROCESSING
ENDIF:
ELSE:
Return to DATA FORMAT PROCESSING
ENDIF:
ENDIF:
```

While the invention has been shown and described with reference to particular embodiments thereof, it will be understood by those skilled in the art that the foregoing and other changes in form and details may be made therein without departing from the spirit and scope of the invention.

I claim:

1. In an information processing system for displaying a data stream of encoded data in more than one column, a method for dividing said data into a plurality of columns comprising:
   referring to a stored page model which describes areas in which said data is to be displayed;
   identifying in said page model a plurality of column balance set areas into which said data is to be evenly distributed;
   detecting a balance column command associated with said data; and
   evenly distributing said data among said identified column balance set areas in response to the detection of said balance column command.

2. The method of claim 1 wherein said step of detecting a balance column command further comprises:
   detecting a first begin column balance control code.

3. The method of claim 2, further comprising:
   storing in an index table, a first identifier associated with said first begin column balance control code.

4. The method of claim 3 wherein said step of storing in an index table further comprises:
   storing in said index table, a location in said data stream at which said first begin column balance control code is detected.

5. The method of claim 4 wherein said step of detecting a balance column command further comprises:
   detecting a first end column balance control code having said first identifier associated therewith.

6. The method of claim 5 wherein said step of evenly distributing said data is responsive to said detection of said first end balance column control code having said first identifier associated therewith.

7. The method of claim 6 wherein said step of detecting a balance column command further comprises:
   detecting a second begin column balance control code after the detection of said first begin balance column control code and before the detection of said first end balance column control code.

8. The method of claim 7, further comprising:
   storing in said index table, a second identifier associated with said second begin column balance control code.

9. The method of claim 8 wherein said step of storing in said index table further comprises:
   storing in said index table, a location in said data stream at which said second begin column balance control code is detected.

10. The method of claim 9 wherein said step of storing in said index table further comprises:
    storing in said index table with said first identifier associated with said first begin balance column control code, a pointer to said second begin balance control.

11. The method of claim 10 wherein said step of detecting a balance column command further comprises:
    detecting a second end column balance control code having said second identifier associated therewith.

12. The method of claim 11 wherein said step of evenly distributing said data is responsive to said detection of said second end balance column control code having said second identifier associated therewith, whereby data bounded by said second begin balance column control and said second end balance column control code is separately balanced within an area surrounded by data bounded by said first begin balance column control code and said first end balance column control code.

13. In an information processing system for displaying a data stream of encoded data in more than one column, a system for dividing said data into a plurality of columns comprising:
    means for referring to a stored page model which describes areas in which said data is to be displayed;
    means connected to said means for referring for identifying in said page model a plurality of column balance set areas into which said data is to be evenly distributed;
    means connected to said means for identifying for detecting a balance column command associated with said data; and
    means connected to said means for detecting for evenly distributing said data among said identified column balance set areas in response to the detection of said balance column command.

14. The system of claim 13 wherein said means for detecting a balance column command further comprises: means for detecting a first begin column balance control code.

15. The system of claim 14, further comprising:
    means connected to said means for detecting for storing in an index table, a first identifier associated with said first begin column balance control code.

16. The system of claim 15 wherein said means for storing in an index table further comprises:
    means for storing in said index table, a location in said data stream at which said first begin column balance control code is detected.

17. The system of claim 16 wherein said means for detecting a balance column command further comprises:
    means for detecting a first end column balance control code having said first identifier associated therewith.

18. The system of claim 17 wherein said means for evenly distributing further comprises means responsive to said detection of said first end balance column control code having said first identifier associated therewith for evenly distributing said data.

* * * * *